2,786,054

CYANINES FROM TRIAZOLO BASES

Leslie G. S. Brooker and Earl J. Van Lare, Rochester, N. Y., assignors to Eastman Kodak Company, Rochester, N. Y., a corporation of New Jersey No Drawing. Application August 19, 1954, Serial No. 451,062

9 Claims. (Cl. 260—240.6)

This invention relates to cyanine dyes which are useful in optically sensitizing photographic silver halide emulsions and a method of making them.

The dyes of our invention can advantageously be represented by the following general formula:

I.
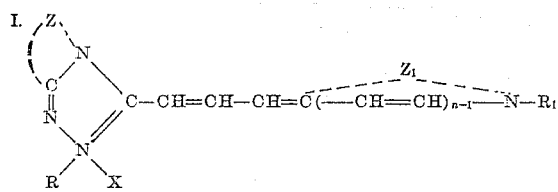

wherein R and $R_1$ each represents an alkyl group, such as methyl, ethyl, propyl, isopropyl, butyl, isobutyl, allyl (vinylmethyl), $\beta$-hydroxyethyl, benzyl (phenylmethyl), etc. (e. g., an alkyl group of the formula $C_mH_{2m+1}$ wherein $m$ represents a positive integer of from 1 to 4), $n$ represents a positive integer from 1 to 2, X represents an acid radical, such as chloride, bromide, iodide, perchlorate, benzenesulfonate, p-toluenesulfonate, methylsulfate, ethylsulfate, etc., Z represents the non-metallic atoms necessary to complete a heterocyclic nucleus of the benzothiazole series or the quinoline series, and $Z_1$ represents the non-metallic atoms necessary to complete a heterocyclic nucleus containing from 5 to 6 atoms in the heterocyclic ring, such as those selected from the group consisting of those of the thiazole series (e. g., thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, etc.), those of the benzothiazole series (e. g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), those of the naphthothiazole series (e. g., $\alpha$-naphthothiazole, $\beta$-naphthothiazole, 5-methoxy-$\beta$-naphthothiazole, 5-ethoxy-$\beta$-naphthothiazole 8-methoxy-$\alpha$-naphthothiazole, 7-methoxy-$\alpha$-naphthothiazole, etc.), those of the thianaphtheno-7',6',4,5-thiazole series (e. g., 4'-methoxythianaphtheno-7',6',4,5-thiazole, etc.), those of the oxazole series (e. g., 4-methyloxazole, 5-methyloxazole, 4-phenyloxazole, 4,5-diphenyloxazole, 4-ethyloxazole, 4,5-dimethyloxazole, 5-phenyloxazole, etc.), those of the benzoxazole series (e. g., benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, etc.), those of the naphthoxazole series (e. g., $\alpha$-naphthoxazole, $\beta$-naphthoxazole, etc.), those of the selenazole series (e. g., 4-methylselenazole, 4-phenylselenazole, etc.), those of the benzoselenazole series (e. g., benzoselenazole, 5-chlorobenzoselenazole, 5-methoxybenzoselenazole, 5-hydroxybenzoselenazole, tetrahydrobenzoselenazole, etc.), those of the naphthoselenazole series (e. g., $\alpha$-naphthoselenazole, $\beta$-naphthoselenazole, etc.), those of the thiazoline series (e. g., thiazoline, 4-methylthiazoline, etc.), those of the 2-quinoline series (e. g., quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), those of the 4-quinoline series (e. g., quinoline, 6-methoxyquinoline, 7-methylquinoline, 8-methylquinoline, etc.), those of the 1-isoquinoline series (e. g., isoquinoline, 3,4-dihydroisoquinoline, etc.), those of the 3-isoquinoline series (e. g., isoquinoline, etc.), those of the benzimidazole series (e. g., 1,3-diethylbenzimidazole, 1-ethyl-3-phenylbenzimidazole, etc.), those of the 3,3-dialkylindolenine series (e. g., 3,3-dimethylindolenine, 3,3,5-trimethylindolenine, 3,3,7-trimethylindolenine, etc.), the pyridine series (e. g., pyridine, 5-methylpyridine, etc.), etc.

It is, therefore, an object of our invention to provide new cyanine dyes. A further object is to provide methods for making these dyes. Still another object is to provide new cyanine dye intermediates. Another object is to provide methods for making these new intermediates. A further object is to provide photographic silver halide emulsions sensitized with the new dyes of our invention. Other objects will become apparent from a consideration of the following description and examples.

According to our invention, we provide the dyes represented by Formula I above by condensing a compound selected from those represented by the following general formula:

II.
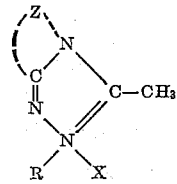

wherein R, X and Z each have the values given above, together with a compound selected from those represented by the following general formula:

III.
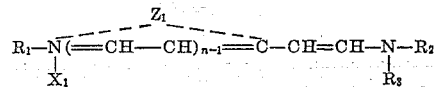

wherein $R_1$, $Z_1$, and $n$ each have the values given above, $X_1$ represents an acid radical, such as those set forth above for X, $R_2$ represents a carboxylic acyl group, such as acetyl, propionyl, butyryl, isobutyryl, benzoyl, toluoyl, etc., and $R_3$ represents an aryl group, such as phenyl, o-, m-, and p-tolyl, etc. (e. g., a monocyclic aromatic group of the benzene series).

The condensations can advantageously be carried out in the presence of a basic condensing agent, such as the trialkylamines (e. g., triethylamine, tripropylamine, triisopropylamine, tributylamine, triisobutylamine, triamylamine, etc.), the N,N-dialkylanilines (e. g., N,N-dimethylaniline, N,N-diethylaniline, etc.), the N-alkylpiperidines (e. g., N-methylpiperidine, N-ethylpiperidine, etc.), etc.

An inert diluent, such as the lower aliphatic alcohols (e. g., ethanol, propanol, isopropanol, butanol, etc.), 1,4-dioxane, cyclohexane, pyridine, quinoline, etc. can also be employed. Heating accelerates the condensations, although temperatures varying from ambient temperature (ca. 25° C.) to the reflux temperature of the reaction mixture can be employed advantageously.

The intermediates represented by Formula II above can advantageously be prepared by heating together a base selected from those represented by the following general formula:

IV.
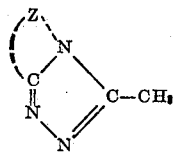

wherein Z has the values given above, with an alkyl salt represented by the following general formula:

V.        R—X wherein R and X each have the values given above. Temperatures varying from about the temperature of the steam bath to about 200° C. can be employed.

The intermediates represented by Formula IV above can be prepared by condensing a compound selected from those represented by the following general formula:

VI.
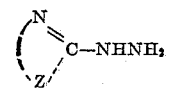

wherein Z has the values given above, together with acetic anhydride in the presence of a strong acid, e. g. glacial acetic acid, phosphoric acid, etc. Where the condensation is slow, improved results can be obtained by first acetylating the hydrazino group of the compound of Formula VI, purifying the acetylated intermediate by crystallization, and completing the condensation by adding fresh acetic anhydride and strong acid, and heating under reflux. The carbocyclic ring of the compounds represented by Formula VI can contain simple substituents, such as chlorine, bromine, iodine, methoxyl, ethoxyl, methyl, ethyl, phenyl, etc. Intermediates represented by Formula VI above have been previously described in Brooker U. S. application Serial No. 442,180, filed July 8, 1954 (now U. S. Patent 2,743,274, issued April 24, 1956) and Bayer et al. U. S. Patent 2,073,600, dated March 16, 1937.

The following examples will serve to illustrate more fully the manner whereby we practice our invention.

*Example 1.—1-methyl-s-triazolo[4,3-a]quinoline*

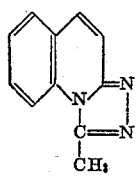

2-quinolylhydrazine (31.8 g., 1 mol.), acetic anhydride (40.8 g., 2 mols.) and glacial acetic acid (100 ml.) were refluxed together for 1 hour. The reaction mixture was poured into 1-l. of water, neutralized with sodium carbonate, and then made strongly alkaline with sodium hydroxide. The mixture was extracted several times with ether to remove the unchanged quinolylhydrazine. On standing, a heavy oil, insoluble in water, ether, benzene and chloroform, slowly separated from the aqueous solution. After standing for two weeks the oil became crystalline. It was filtered off and recrystallized from ethyl acetate. A 65% crude yield of colorless crystals was obtained, M. P. 155–158° C.

*Example 2.—2-ethyl-1-methyl-s-triazolo[4,3-a]quinolinium iodide*

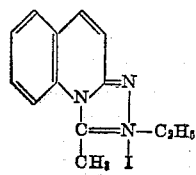

1-methyl-s-triazolo[4,3-a]quinoline (9 g., 1 mol.) and ethyl iodide (12 g., 1½ mols.) were heated on a steam bath for 4 hours. The solid was ground in a mortar with acetone, filtered off and washed well with acetone. A 74% yield of tan crystals was obtained, M. P. 192–194° C. dec.

*Example 3.—1-methyl-s-triazolo[3,4-b]benzothiazole*

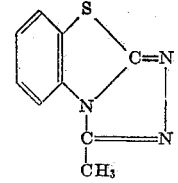

2-acetylhydrazinobenzothiazole (10.4 g., 1 mol.), acetic anhydride (50 ml.) and phosphoric acid (0.5 ml.) were refluxed together for 1 hour. The reaction mixture was poured into 400 ml. of water with stirring. The mixture was made alkaline with sodium carbonate solution, and the product filtered off and washed with water. After recrystallization from methyl alcohol an 81% yield of colorless crystals was obtained, M. P. 142–144° C.

*Example 4.—2-acetylhydrazinobenzothiazole*

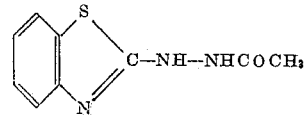

2-hydrazinobenzothiazole (33 g., 1 mol.), acetic anhydride (40.8 g., 2 mols.) and acetic acid (100 ml.) were refluxed together for 1 hour. The acetic acid and acetic anhydride were removed on a steam bath under reduced pressure. The residue was dissolved in ethyl alcohol (200 ml.) and the solution made alkaline with 10% potassium carbonate solution. The mixture was cooled and the solid filtered off, washed with water and then with ethyl alcohol. After recrystallization from methyl alcohol, a 53% yield of colorless crystals was obtained, M. P. 213–215° C.

*Analysis.*—Calc'd for $C_9H_9N_3OS$: C, 52.1; H, 4.3. Found: C, 52.3; H, 4.3.

*Example 5.—2',3-diethyloxa-1'-s-triazolo[4,3-a]quinocarbocyanine iodide*

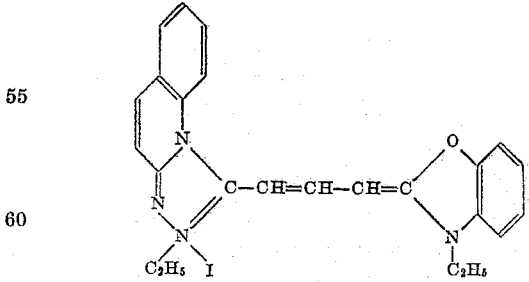

2-ethyl-1-methyl-s-triazolo[4,3-a]quinolinium iodide (1.7 g., 1 mol.), 2-β-acetanilidovinylbenzoxazole ethiodide (2.2 g., 1 mol.), pyridine (10 ml.) and triethylamine (0.5 g., 1 mol.) were refluxed together for 1 hour. The reaction mixture was cooled and the dye precipitated with ether as a heavy oil. The oil was washed with ether and then stirred with a small amount of ethyl alcohol. After cooling for 1 hour the solid, which separated, was filtered off and washed with ethyl alcohol. After two recrystallizations from methyl alcohol, a 14% yield of orange needles was obtained, M. P. 256–257° C. dec.

*Example 6.—3 - ethyl - 2' - methyloxa - 1' - s - triazolo-
[3,4-b]benzothiazolocarbocyanine iodide*

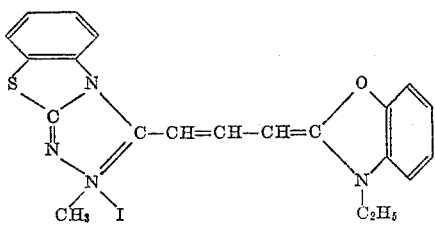

1-methyl-s-triazolo[3,4-b]benzothiazole (1.9 g., 1 mol.) and methyl p-toluenesulfonate (1.9 g., 1 mol.) were heated together at 160–170° C. for 3 hours. After cooling, 2-β-acetanilidovinylbenzoxazole ethiodide (4.3 g., 1 mol.), pyridine (10 ml.) and triethylamine (2 g., 2 mols.) were added and the mixture was refluxed for 10 minutes. After chilling, the solid was filtered off, washed lightly with methyl alcohol and then with acetone. The crude dye was dissolved in methyl alcohol and filtered hot through a bed of Norit. After chilling, the solid was filtered off and washed lightly with methyl alcohol. After recrystallization from methyl alcohol, a 15% yield of scarlet crystals was obtained, M. P. 259–260° C. dec.
*Analysis.*—Calc'd for $C_{21}H_{19}IN_4OS$: I, 25.3. Found: I, 25.7.

*Example 7.—3-ethyl-2'-methylthia-1'-triazolo
[3,4-b]benzothiazolocarbocyanine iodide*

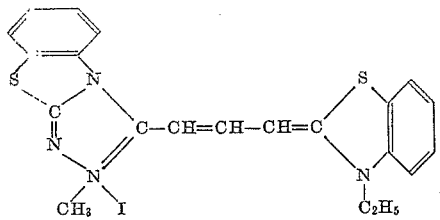

1-methyl - s - triazolo[3,4-b]benzothiazole (1.9 g., 1 mol.) and methyl p-toluenesulfonate (1.9 g., 1 mol.) were heated together at 160–170° C. for 3 hours. After cooling, 2-β-acetanilidovinylbenzothiazole ethiodide (4.5 g., 1 mol.), pyridine (10 ml.) and triethylamine (2 g., 2 mols.) were added and the mixture was refluxed for 5 minutes. After chilling, the solid was filtered off, washed lightly with methyl alcohol and then with acetone. The crude dye was dissolved in methyl alcohol and filtered hot through a bed of Norit. After chilling, the dye was filtered off and washed lightly with methyl alcohol. After recrystallization from methyl alcohol, a 16% yield of lustrous dark red needles was obtained, M. P. 270–271° C. dec.
*Analysis.*—Calc'd for $C_{21}H_{19}IN_4S_2$: I, 24.5. Found: I, 24.8.

*Example 8.—3-ethyl-2'-methylselena-1'-s-triazolo
[3,4-b]benzothiazolocarbocyanine iodide*

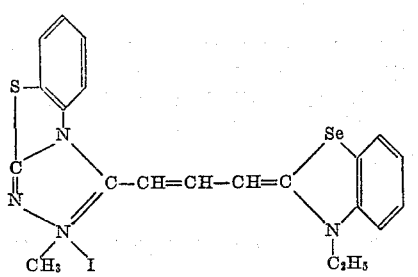

1 - methyl-s-triazolo[3,4-b]benzothiazole (1.9 g., 1 mol. plus 100 percent excess) and methyl p-toluenesulfonate (1.9 g., 1 mol. plus 100 percent excess) were heated together at 160–170° C. for 3 hours. After cooling, 2-β-acetanilidovinylbenzoselenazole ethiodide (2.5 g., 1 mol.), pyridine (10 ml.), and triethylamine (2 g., 1 mol. plus 300 percent excess) were added and the mixture was refluxed for 10 minutes. After chilling, the solid was filtered off and washed with water and then with acetone. After two recrystallizations from methyl alcohol, a 12 percent yield of reddish needles with a green reflex was obtained, M. P. 262–263° C. dec.

*Example 9.—3 - ethyl-2'-methyl-4,5-benzothia-1'-s-triazolo
[3,4-b]benzothiazolocarbocyanine iodide*

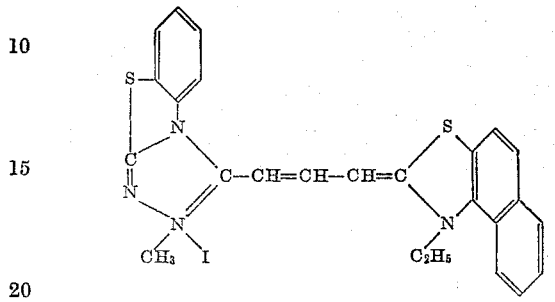

1 - methyl - s - triazolo[3,4-b]benzothiazole (1.9 g., 1 mol. plus 100 percent excess) and methyl p-toluenesulfonate (1.9 g., 1 mol. plus 100 percent excess were heated together at 160–170° C. for 3 hours. After cooling, 2 - β-anilinovinylnaphtho[1,2]thiazole etho - p - toluenesulfonate (2.5 g., 1 mol.), pyridine (10 ml.), triethylamine (1.35 g., 2 mols., plus 35 percent excess), and acetic anhydride (0.5 g., 1 mol.) were added and the mixture was refluxed for 10 minutes. After chilling, the solid was filtered off, washed with water and then with acetone. After two recrystallizations from methyl alcohol, a 38 percent yield of reddish crystals were obtained, M. P. 238–239° C. dec.

*Example 10.—3-ethyl-2'-methyloxa-1'-s-triazolo
[4,3-a]quinocarbocyanine iodide*

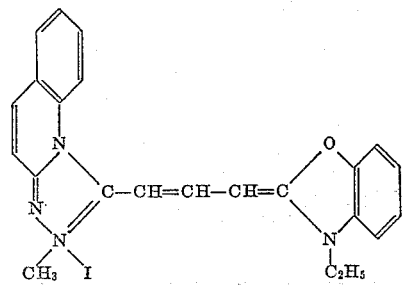

1,2-dimethyl-s-triazolo[4,3-a]quinolinium iodide (1.6 g., 1 mol.) (from 1-methyl-s-triazolo[4,3-a]quinoline and methyl iodide), 2-β-acetanilidovinylbenzoxazole ethiodide (2.2 g., 1 mol.), pyridine (10 ml.), and triethylamine (0.5 g., 1 mol.) were refluxed together for one hour. The reaction mixture was cooled and the solid filtered off and washed with acetone. After two recrystallizations from methyl alcohol, a 6 percent yield of deep-yellow crystals was obtained, M. P. 277–278° C. dec.

*Example 11.—2'-ethyl - 3 - methylthiazolino-1'-s-triazolo-
[4,3-a]quinocarbocyanine iodide*

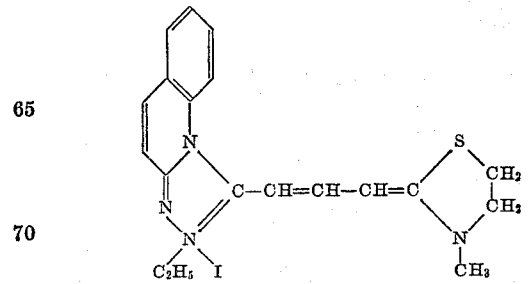

2-ethyl-1-methyl-s-triazolo[4,3-a] quinolinum iodide (2.2 g., 1 mol.), 2-β-anilinovinylthiazoline methiodide (2.26 g., 1 mol.), pyridine (10 ml.), triethylamine (1.75 g., 2 mols.), and acetic anhydride (0.67 g., 1 mol.) were refluxed together for one hour. After cooling, the dye was precipitated with ether. The oily material was washed with ether and then with water. After stirring with acetone, the crystalline dye was filtered off, washed with acetone and dried. After two recrystallizations from methyl alcohol, a 24 percent yield of brownish-yellow crystals was obtained, M. P. 253–254° C. dec.

By replacing the 1-methyl-s-triazolo[3,4-b]benzothiazole of Example 9 by a molecularly equivalent amount of 6-methoxy - 1 - methyl-s-triazolo[3,4-b]benzothiazole (obtained from 2-hydrazino-6-methoxybenzothiazole and acetic anhydride), 3 - ethyl-6′-methoxy-2′-methyl - 4,5-benzothia - 1′-s-triazolo[3,4-b]benzothiazolocarbocyanine iodide represented by the following formula:

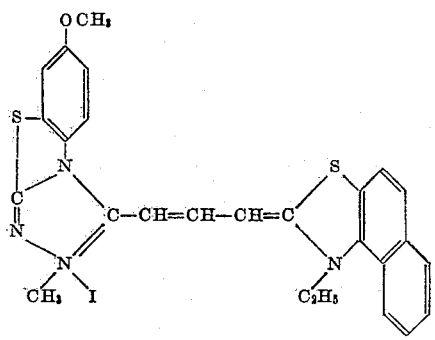

can be obtained. In like manner, other intermediates selected from those represented by Formula II above can be condensed with intermediates selected from those represented by Formula III above to give dyes represented by Formula I above.

The intermediates selected from those represented by Formula II above can also be condensed with aromatic aldehydes, such as p-dimethylaminobenzaldehyde, p-diethylaminobenzaldehyde, etc. to give styryl dyes, which are useful in filter layers of photographic elements. The condensations can advantageously be accelerated by heating, and also by use of a basic condensing agent, such as piperidine. The following example describes the preparation of a typical styryl dye.

*Example 12.—1-p-dimethylaminostyryl-2-ethyl-s-triazolo[4,3-a]quinolinium iodide*

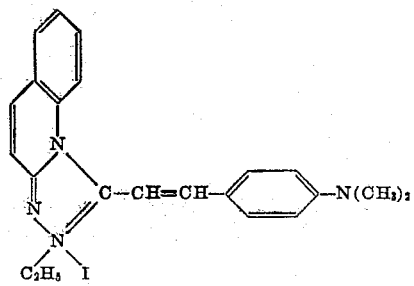

2 - ethyl - 1 - methyl - s - triazolo[4,3 - a]quinolinium iodide (1.7 g., 1 mol.), p-dimethylaminobenzaldehyde (0.75 g., 1 mol.), pyridine (10 ml.) and 3 drops of piperidine were refluxed together for one hour. After cooling, the dye was precipitated with ether, washed with ether, and stirred with a small amount ethyl alcohol. Dye crystallized out and after chilling, it was filtered off and washed with acetone. After two recrystallizations from ethyl alcohol, a 10% yield of yellow needles was obtained, M. P. 261–262° C. dec.

The intermediates selected from those represented by Formula II above can also be condensed with an intermediate selected from those represented by the following general formula:

VII. 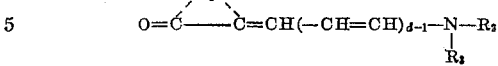

wherein $R_2$ and $R_3$ each have the values given above, $d$ represents a positive integer of from 1 to 2, and Q represents the non-metallic atoms necessary to complete a heterocyclic nucleus containing from 5 to 6 atoms in the heterocyclic ring. Intermediates selected from those represented by Formula VII are described in Heseltine et al. U. S. Patent 2,666,761, dated January 19, 1954 (see Col. 5, lines 35–40). The resulting dyes are merocyanines and can also be used to optically sensitize photographic silver halide emulsions. The following two examples will serve to illustrate the method of preparing such merocyanine dyes.

*Example 13.—3-ethyl-5-[(2-ethyl-1(2H)-s-triazolo-[4,3-a]quinolylidene)ethylidene]rhodanine*

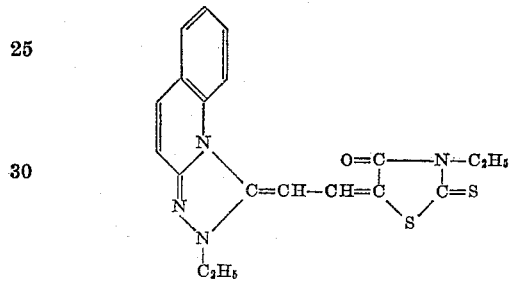

2 - ethyl - 1 - methyl - s - triazolo[4,3 - a]quinolinium iodide (1.7 g., 1 mol.), 5-acetanilidomethylene-3-ethylrhodanine (1.5 g., 1 mol.), pyridine (15 ml.) and triethylamine (0.5 g., 1 mol.) were refluxed together for one hour. After chilling, the dye was filtered off and washed with ethyl alcohol. After two recrystallizations from methyl alcohol, a 16% yield of reddish crystals with a blue reflex was obtained, M. P. 226–227° C. dec.

*Example 14.—3-ethyl-5-[(2-methyl-1(2H)-s-triazolo-[3,4-b]benzothiazolylidene)ethylidene]rhodanine*

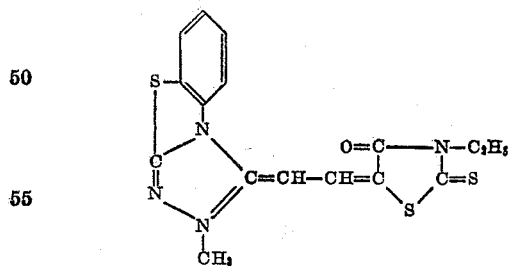

1-methyl-s-triazolo[3,4-b]benzothiazole (1.9 g., 1 mol.) and methyl p-toluenesulfonate (1.9 g., 1 mol.) were heated together at 160–170° C. for 3 hours. After cooling, 5-acetanilidomethylene-3-ethylrhodanine (3 g., 1 mol.), pyridine (10 ml.) and triethylamine (2 g., 2 mols.) were added, and the mixture was refluxed 30 minutes. After chilling, the dye was filtered off and washed with methyl alcohol. The crude dye was dissolved in pyridine and precipitated with methyl alcohol. A 23% yield of scarlet powder was obtained, M. P. 276–277° C. dec.

*Analysis.*—Calc'd for $C_{16}H_{14}N_4OS_3$: C, 51.3; H, 3.8. Found: C, 51.4; H, 3.7.

As noted above we have found that our new dyes spectrally sensitize photographic silver halide emulsions when incorporated therein. The dyes are especially useful for extending the spectral sensitivity of the customarily employed gelatino-silver-chloride, gelatino-silverchlorobromide, gelatino-silver-bromide and gelatino-silver-bromiodide developing-out emulsions. To prepare emulsions sensitized with one or more of our new dyes, it is only necessary to disperse the dye or dyes in the emulsions. The methods of incorporating dyes in emulsions are simple and are known to those skilled in the art. In practice, it is convenient to add the dyes to the emulsions in the form of a solution in an appropriate solvent. Methanol or acetone has proved satisfactory as a solvent for most of our new dyes. Where the dyes are quite insoluble in methyl alcohol, a mixture of methyl alcohol and pyridine is advantageously employed as a solvent. The dyes are advantageously incorporated in the finished, washed emulsions and should be uniformly distributed throughout the emulsions. The particular solvent used will, of course, depend on the solubility properties of the particular dye.

The concentration of the dyes in the emulsions can vary widely, e. g. from 5 to 100 mg. per liter of flowable emulsion. The concentration of the dyes will vary according to the type of emulsion and according to the effect desired. The suitable and most economical concentration for any given emulsion will be apparent to those skilled in the art, upon making the ordinary tests and observations customarily used in the art of emulsion making. To prepare a gelatino-silver-halide emulsion sensitized with one or more of our new dyes, the following procedure is satisfactory.

A quantity of dye is dissolved in methyl alcohol or acetone (or a mixture of methyl alcohol and pyridine) and a volume of this solution, which may be diluted with water, containing from 5 to 100 mg. of dye, is slowly added to about 1000 cc. of gelatino-silver-halide emulsion, with stirring. Stirring is continued until the dye is thoroughly dispersed in the emulsion.

With most of our dyes, from 10 to 20 mg. of dye per liter of gelatino-silver-bromide or bromoiodide emulsion (containing about 40 g. of silver halide) suffices to produe the maximum sensitizing effect. With the finer grain emulsions, somewhat larger concentration of dye may be needed to produce the maximum sensitizing effect.

The above statements are only illustrative, as it will be apparent that the dyes can be incorporated in photographic emulsions by any of the other methods customarily employed in the art, e. g. by bathing a plate or film upon which an emulsion is coated in a solution of the dye in an appropriate solvent. However, bathing methods are ordinarily not to be preferred. Emulsions sensitized with the dyes can be coated on suitable supports, such as glass, cellulose derivative film, resin film or paper in the usual manner.

Photographic silver halide emulsions, such as those listed above, containing the sensitizing dyes of our invention can also contain such addenda as chemical sensitizers (e. g. sulfur sensitizers, such as allyl thiocarbamide, thiourea, allylisothiocyanate, cystine, etc.), various gold compounds, such as potassium chloroaurate, auric trichloride, etc. (see U. S. Patents 2,540,085; 2,597,856; and 2,597,915, for example), various palladium compounds (such as palladium chloride (U. S. 2,540,086), potassium chloropalladate (U. S. 2,598,079) etc., or mixtures of such sensitizers), antifoggants (e. g. benzotriazole, nitrobenzimidazole, 5-nitroindazole, etc. (see Mees: "The Theory of the Photographic Process," Macmillan pub. 1942, pg. 460), or mixtures thereof), hardeners (e. g., formaldehyde (U. S. 1,763,533), chrome alum (U. S. 1,763,533), glyoxal (Ger. 538,713), dibromacrolein (Br. 406,750), etc.), color couplers (e. g., such as those described in U. S. Patent 2,423,730, Spence and Carroll U. S. Patent 2,640,776, issued June 2, 1953, etc), or mixtures of such addenda. Dispersing agents for color couplers, such as substantially water-insoluble, high boiling crystalloidal materials, such as those set forth in U. S. Patents 2,322,027 and 2,304,940, can also be employed in the above described emulsions.

What we claim as our invention and desire secured by Letters Patent of the United States is:

1. A carbocyanine dye selected from those represented by the following general formula:

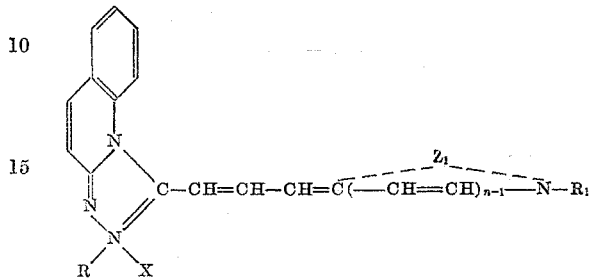

wherein $R$ and $R_1$ each represents an alkyl group of the formula $C_mH_{2m+1}$ wherein $m$ represents a positive integer of from 1 to 4, X represents an acid radical, $n$ represents a potitive integer of from 1 to 2, and $Z_1$ represents the non-metallic atoms necessary to complete a heterocyclic nucleus selected from the group consisting of those of the thiazole series, those of the benzothiazole series, those of the naphthothiazole series, those of the oxazole series, those of the benzoxazole series, those of the naphthoxazole series, those of the selenazole series, those of the benzoselenazole series, those of the naphthoselenazole series, those of the thiazoline series, those of the thianaphtheno-7',6',4,5-thiazole series, those of the 2-quinoline series, those of the 4-quinoline series, those of the 1-isoquinoline series, those of the benzimidazole series, those of the 3,3-dialkylindolenine series, and those of the pyridine series.

2. A carbocyanine dye selected from those represented by the following general formula:

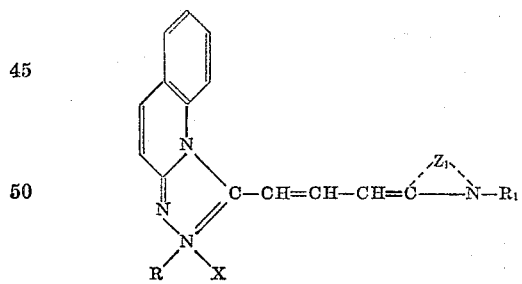

wherein $R$ and $R_1$ each represents an alkyl group of the formula $C_mH_{2m+1}$ wherein $m$ represents a positive integer of from 1 to 4, X represents an acid radical, and $Z_1$ represents the non-metallic atoms necessary to complete a heterocyclic nucleus of the benzoxazole series.

3. The carbocyanine dye represented by the following formula:

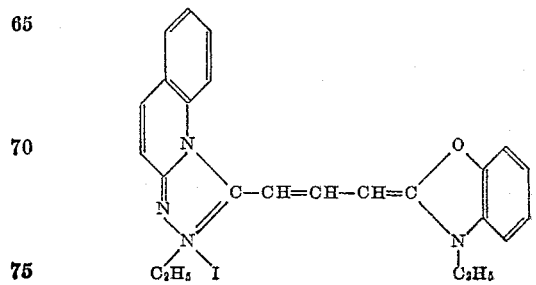

4. The carbocyanine dye represented by the following formula:

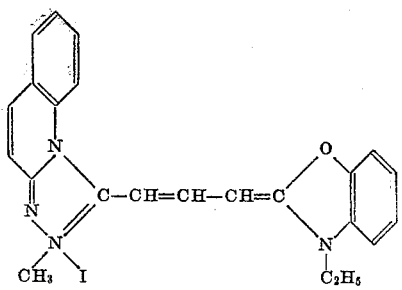

5. A carbocyanine dye selected from those represented by the following general formula:

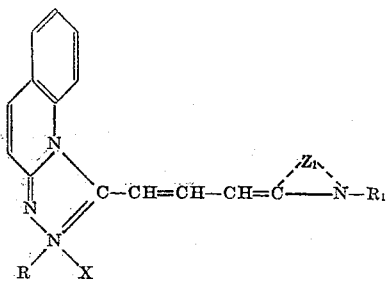

wherein R and $R_1$ each represents an alkyl group of the formula $C_mH_{2m+1}$ wherein $m$ represents a positive integer of from 1 to 4, X represents an acid radical, and $Z_1$ represents the non-metallic atoms necessary to complete a heterocyclic nucleus of the thiazoline series.

6. The carbocyanine dye represented by the following formula:

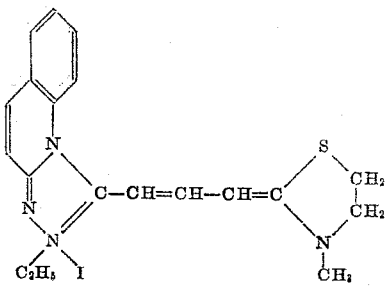

7. A process for preparing carbocyanine dyes comprising condensing a compound selected from those represented by the following general formula:

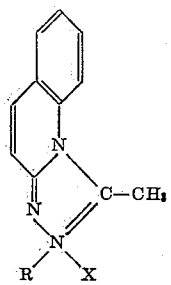

wherein R represents an alkyl group, and X represents an acid radical, together with a compound selected from those represented by the following general formula:

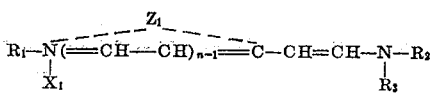

wherein $R_1$ represents an alkyl group, $R_2$ represents a carboxylic acyl group, $R_3$ represents an aryl group, $X_1$ represents an acid radical, $n$ represents a positive integer of from 1 to 2, and $Z_1$ represents the non-metallic atoms necessary to complete a heterocyclic nucleus containing five atoms in the heterocyclic ring when $n$ is 1 and six atoms in the heterocyclic ring when $n$ is 2.

8. A process according to claim 7 wherein a basic condensing agent is present during the condensation.

9. A process according to claim 8 wherein the basic condensing agent is triethylamine.

References Cited in the file of this patent

UNITED STATES PATENTS

| | | |
|---|---|---|
| 2,439,210 | Heimbach | Apr. 6, 1948 |
| 2,467,692 | Petrov | Apr. 19, 1949 |
| 2,578,757 | Steiger | Dec. 18, 1951 |
| 2,646,430 | Brooker | July 21, 1953 |
| 2,689,849 | Brooker | Sept. 21, 1954 |
| 2,691,024 | Horlein | Oct. 5, 1954 |